(12) United States Patent
Belser et al.

(10) Patent No.: US 6,898,031 B1
(45) Date of Patent: May 24, 2005

(54) METHOD FOR REPLICATING MAGNETIC PATTERNS ON HARD DISK MEDIA

(75) Inventors: Karl A. Belser, San Jose, CA (US); Neil Deeman, Alamo, CA (US); Ga-Lane Chen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 563 days.

(21) Appl. No.: 09/838,683

(22) Filed: Apr. 19, 2001

Related U.S. Application Data

(60) Provisional application No. 60/198,192, filed on Apr. 19, 2000.

(51) Int. Cl.[7] .............................. G11B 5/86; G11B 5/84
(52) U.S. Cl. ............................. 360/15; 360/16; 360/17; 360/48; 360/135; 428/64.2; 428/694 B; 369/277; 369/280; 369/285; 216/41; 216/66; 216/67
(58) Field of Search ............................. 360/15–17, 48, 360/135, 39; 369/277, 280, 283–285; 428/64.2–64.4, 694 T, 694 B, 694 BA, 694 BN, 694 TR; 216/66, 37, 47, 41, 22, 67

(56) References Cited

U.S. PATENT DOCUMENTS

| | | | |
|---|---|---|---|
| 4,903,296 A | * | 2/1990 | Chandra et al. ............... 705/56 |
| 5,766,495 A | | 6/1998 | Parette |
| 5,772,905 A | | 6/1998 | Chou |
| 5,820,769 A | | 10/1998 | Chou |
| 6,187,413 B1 | | 2/2001 | Kuo et al. |
| 6,193,898 B1 | | 2/2001 | Kano et al. |
| 6,254,966 B1 | * | 7/2001 | Kondo ........................ 428/156 |
| 6,303,205 B1 | * | 10/2001 | Tanaka et al. .............. 428/65.3 |
| 6,365,059 B1 | | 4/2002 | Pechenik |
| 6,391,216 B1 | * | 5/2002 | Nakatani ...................... 216/41 |
| 6,602,620 B1 | * | 8/2003 | Kikitsu et al. ........... 428/694 T |

* cited by examiner

Primary Examiner—David Hudspeth
(74) Attorney, Agent, or Firm—Raghunath S. Minisandram; Jesus Del Castillo

(57) ABSTRACT

A system and method for replicating magnetic patterns on hard disk media includes a mask located over or above a magnetic recording layer. The recording layer may include a single, dual, or multi-layer recording layer. A pattern is or has been formed in the mask, where the pattern defines the recordable regions and the non-recordable regions to be created in one or more layers within the recording layer. Portions of the recording layer are then exposed. An etch may then be performed to create grooves within one or more layers in the exposed regions of the recording layer. The magnetic properties of at least one layer in the exposed portions of the recording layer are then altered in order to create recordable or non-recordable regions. The mask is then removed from the recording layer.

24 Claims, 8 Drawing Sheets

METHOD FOR REPLICATING MAGNETIC PATTERNS ON HARD DISK MEDIA

CROSS REFERENCE TO RELATED APPLICATIONS

This application is related to and claims the benefit of commonly assigned U.S. Provisional Application No. 60/198,192, filed on Apr. 19, 2000 and entitled "Method For Replicating Magnetic Patterns On Hard Disk Media." The subject matter of this related application is incorporated herein by reference.

BACKGROUND

1. Field of the Invention

This invention relates to magnetic recording media, such as the magnetic recording media used in hard disk drives, and in particular to a method for fabricating magnetic recording media. Still more particularly, the present invention relates to a method for replicating magnetic patterns on hard disk media.

2. Description of the Prior Art

Designers, manufacturers, and users of computing systems require reliable and efficient digital information storage and retrieval equipment. Conventional magnetic disk drive systems are typically used and are well known in the art. As the amount of information that is stored digitally increases, however, users of magnetic recording media need to be able to store larger and larger amounts of data. To meet this demand, designers of magnetic recording media are working to reduce the size of the features on a recording disk, because the storage capacity of a recording disk is a function of the number of closely spaced concentric tracks on the disk. Some of the recording disk surface area, however, must be used for purposes other than data storage.

Conventional magnetic storage disks utilize various types of indexing marks and alignment indicia to help keep the head properly aligned on a particular track. These marks and indicia are often recorded in servo sectors, which are angularly-spaced reserved portions of the recording disk surface that extend out approximately radially from the disk centers. Servo sectors use recording disk surface area that could otherwise be used for data storage. Consequently, servo sector information must be stored as efficiently as possible in order to provide users with the most storage capacity possible.

Additionally, as the demand to store more data on each disk increases, designers are increasing the number of tracks on each disk. However, with track densities at and exceeding ten thousand tracks per inch, the tasks of increasing data storage capacity and writing servo patterns with suitable geometric accuracy are becoming increasingly difficult. Therefore, developing new techniques for manufacturing magnetic recording media remains a significant consideration for designers, manufacturers, and users of contemporary electronic devices.

SUMMARY

In accordance with the present invention, a system and method are disclosed for replicating magnetic patterns on hard disk media. In one embodiment, a pattern is formed in a mask and the mask is placed over or above a recording layer. The recording layer may include a single, dual, or multi-layer recording layer. The pattern defines the recordable regions and the non-recordable regions to be created in one or more layers within the recording layer. The magnetic properties of portions of the recording layer are then altered in order to create recordable or non-recordable regions. The mask is then removed from the recording layer.

In certain embodiments, the mask may comprise a photoresist layer that is exposed to a light source and then developed such that portions of the photoresist layer are removed. Portions of the recording layer that correspond to the removed portions of the photoresist layer are then uncovered. The uncovered portions of the recording layer may then be exposed to a plasma treatment. Ions within the plasma interact with one or more layers in the exposed portions of the recording layer to change the magnetic properties of the exposed regions. The remaining photoresist layer may then be removed.

In other embodiments, the mask may comprise a resist layer and the pattern is formed in the resist layer using imprint lithography. One method for performing imprint lithography is to use a stamper to imprint the desired pattern into the resist layer. After the pattern is imprinted in the resist layer, portions of the resist layer are compressed while other portions of the resist layer are at or near their original thickness. The compressed portions of the resist layer are then removed in order to expose corresponding portions of the recording layer. The uncovered portions of the recording layer may then be exposed to a plasma treatment. The magnetic properties of one or more layers in the exposed regions of the recording layer are altered by the plasma and differ from the magnetic properties of the regions covered by the resist layer.

In yet other embodiments, one or more layers within the exposed portions of the recording layer may be etched prior to the plasma treatment. The etch creates grooves in the exposed regions of the recording layer. The grooves may compensate for any expansion in the recording layer caused by the plasma treatment.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DETAILED DESCRIPTION

To facilitate an understanding of the present invention, it is described hereinafter in the context of a specific embodiment. In particular, reference is made to the implementation of the invention in a magnetic hard disk media for a hard disk drive. It will be appreciated, however, that the practical applications of the invention are not limited to this particular embodiment. Rather, the invention can be employed in other types of magnetic recording media, one example being magneto-optical hard disk media.

Figure 1:
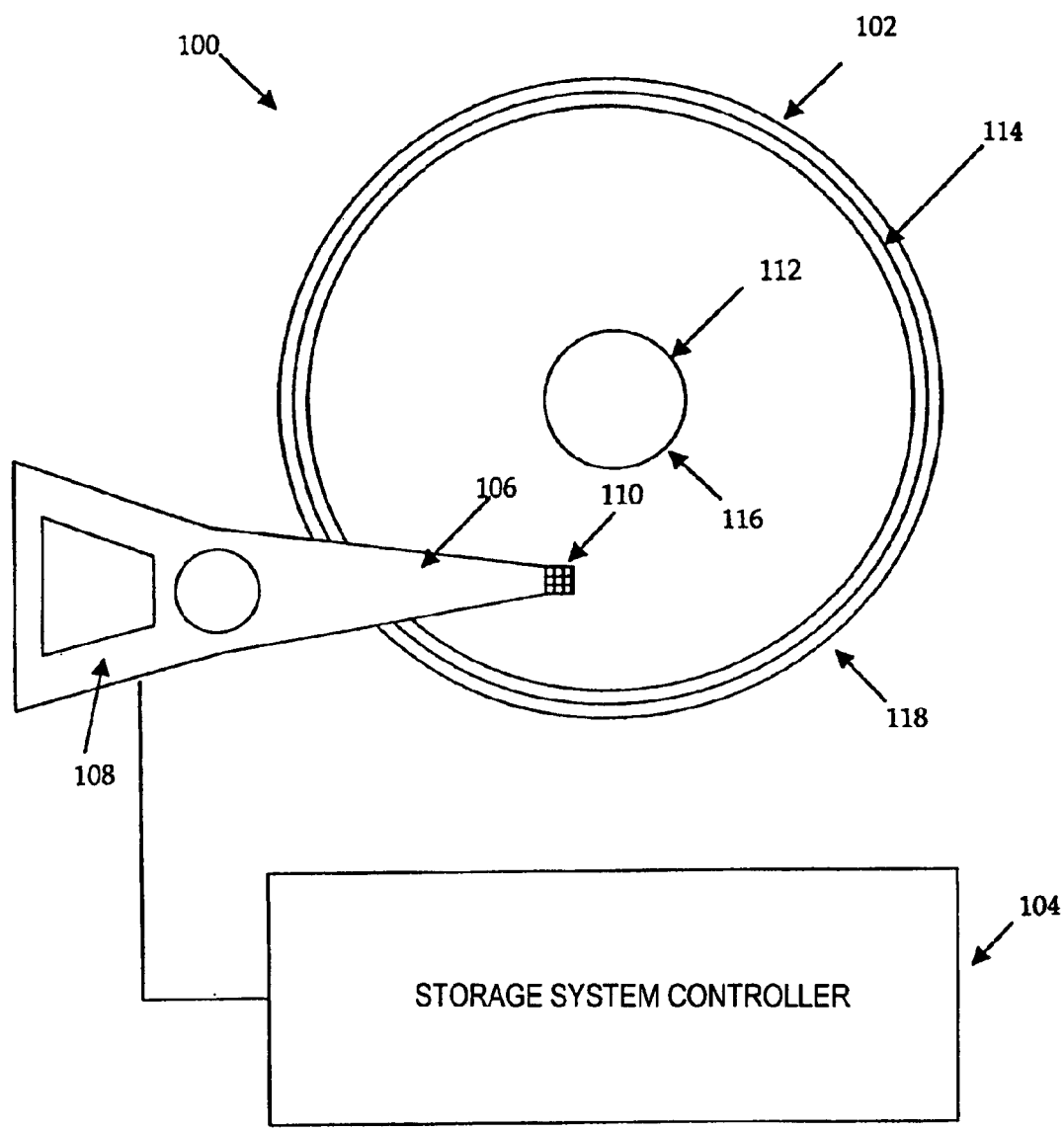
FIG. 1 is a diagram of a data storage system that may be used with the present invention.

With reference now to the figures and in particular with reference to FIG. 1, a data storage system that can be used with the present invention is shown. Data storage system 100 in this exemplary embodiment is a hard disk drive system. Data storage system 100 includes one or more storage disks 102, a storage system controller 104, an actuator 106, a voice coil motor 108, a recording head 110, and a rotating spindle 112. The recording head 110 is comprised of at least one read head and at least one write head, and is positioned at the end of actuator 106. Actuator 106 is moved via voice coil motor 108. The recording head 110 transfers data between storage system controller 104 and a specific physical location on storage disk 102. Data is preferably stored in many approximately consecutively numbered concentric rings or "tracks" 114 on storage disk 102. For clarity, only two tracks 114 are shown in FIG. 1. The tracks are displaced radially from each other, beginning at the inner diameter 116 of the disk 102 and continuing to the outer diameter 118 of the disk 102.

Storage system controller 104 may randomly access a specific logical location on storage disk 102 via a particular track address and a particular sector address. Tracks 114 are very closely spaced in order to maximize storage capacity and economy. The mechanical precision of the movement of storage disk 102 and the movement of recording head 110 is critical to accessing the proper data storage location on storage disk 102. Storage system controller 104 thus requires some means for precisely positioning recording head 110 quickly and accurately over tracks 114 for subsequent storage and retrieval operations.

Figure 2:
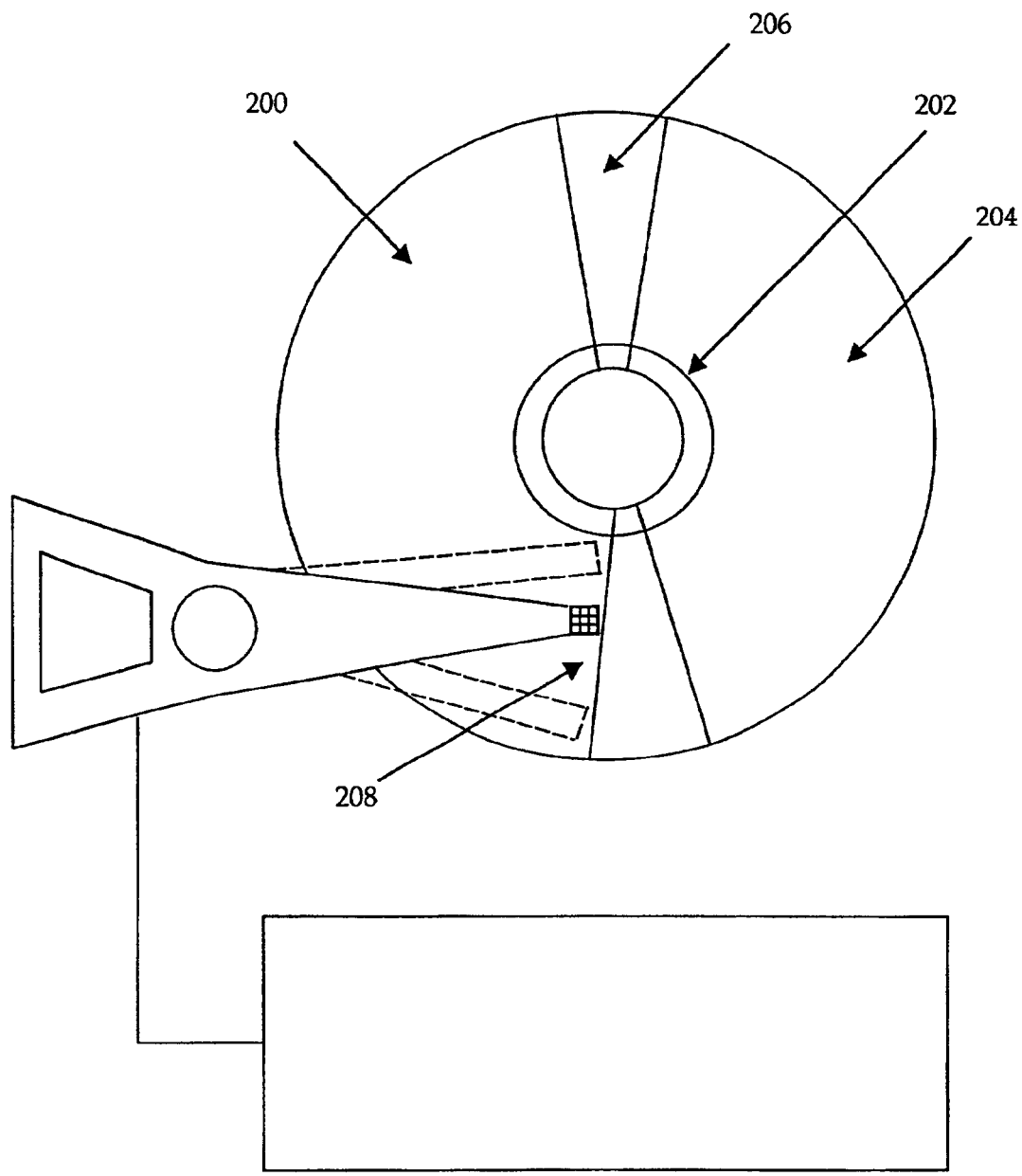
FIG. 2 is a diagram depicting an upper surface of a recording disk utilized in the disk drive assembly of FIG. 1.
Figure 3:
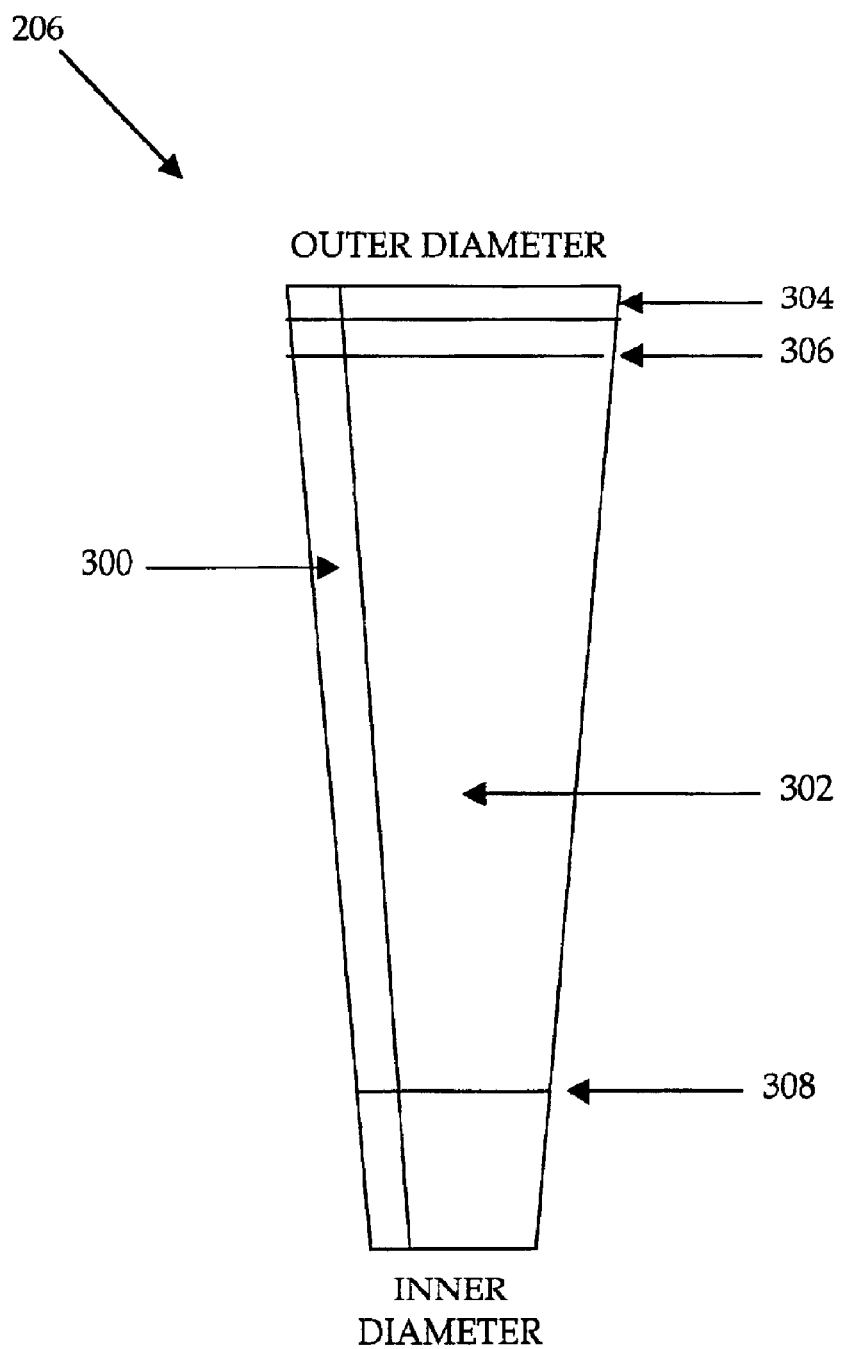
FIG. 3 is a linearized diagram of one embodiment of a sector of the recording disk illustrated in FIG. 2.

Referring now to FIG. 2, a diagram of a surface of an exemplary storage disk is illustrated. The surface 200 of storage disk 102 typically includes a landing zone 202, a useable data zone 204, arc-shaped sectors 206, and an arc-shaped path 208 taken across the surface 200 by recording head 110. A linearized diagram of an exemplary sector 206 is shown in FIG. 3. Sector 206 includes a servo sector 300, a data wedge 302, a pair of neighboring numbered concentric tracks 304 and 306, and a border 308 between landing zone 202 and useable data zone 204. Data wedge 302 includes stored user data, while servo sector 300 includes address and alignment information (e.g. servo marks) used by the disk drive system. The present invention can be used to replicate magnetic patterns in servo sectors and/or data wedges.

Figure 4A:
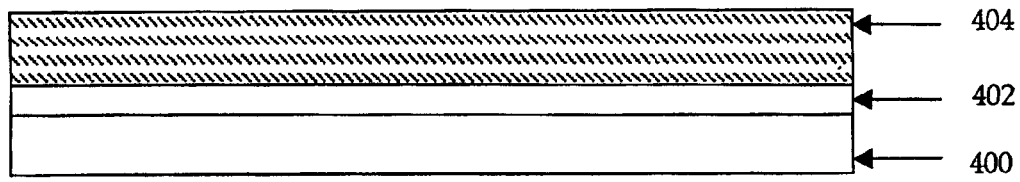
FIGS. 4(a)–4(e) are diagrams illustrating an exemplary method for replicating magnetic patterns on a hard disk media according to one embodiment of the present invention.

Referring to FIGS. 4(a)–4(e), diagrams illustrating an exemplary method for replicating magnetic patterns on a hard disk media according to one embodiment of the present invention are shown. FIG. 4a depicts a substrate 400, which can be comprised of a glass ceramic substrate, an aluminum substrate, or an aluminum substrate with a nickel phosphorus coating. A recording layer 402 lies on the surface of the substrate 400, and is used to write data to, and read data from, the storage disk. In this exemplary embodiment, the recording layer 402 is comprised of a magnetic recording layer. Recording layer 402 typically has a thickness of approximately ten to twenty nanometers.

In this exemplary embodiment, the recording layer 402 is comprised of a cobalt chromium (CoCr) layer. Those skilled in the art will appreciate, however, that other materials can be used for the recording layer. Examples include, but are not limited to, cobalt chromium platinum (CoCrPt) and cobalt chromium platinum boron (CoCrPtB).

Furthermore, in certain embodiments, the recording layer may include, but is not limited to, two or more layers. For example, the recording layer 402 may be a dual-layer recording layer comprised of a first layer and a second layer. The first layer may include, but is not limited to, a chromium layer (Cr). The second layer may include, but is not limited to, a cobalt chromium (CoCr) layer. However, other materials may be used for the first and second layers, such as cobalt platinum (CoPt), cobalt palladium (CoPd), or cobalt-platinum platinum (CoPt/Pt).

Alternatively, recording layer 402 may be configured as a multi-layer recording layer. The multi-layers may be comprised of, but not limited to, alternating layers of cobalt platinum (CoPt), cobalt palladium (CoPd), or cobalt-platinum platinum (CoPt/Pt). The materials configured in a multi-layer recording layer are determined by their properties. A first layer (or layers) is typically grown on the surface of the substrate in order to promote the proper crystal orientation and enhance magnetic performance, while the additional layers overlying the first layer are configured to create a desired coercivity and enhance magnetic performance.

Referring again to FIG. 4(a), a mask 404 overlies the recording layer 402: The mask 404 includes a pattern to be formed in the recording layer 402, wherein the pattern defines the recordable and non-recordable areas to be created in one or more layers within the recording layer 402. The mask 404 may be implemented and configured in any desired manner. For example, the mask 404 may be comprised of, but is not limited to, a resist layer, a photoresist layer, a silicon, or a silicon dioxide layer. Any material that can be patterned may be used as a mask.

Figure 4B:
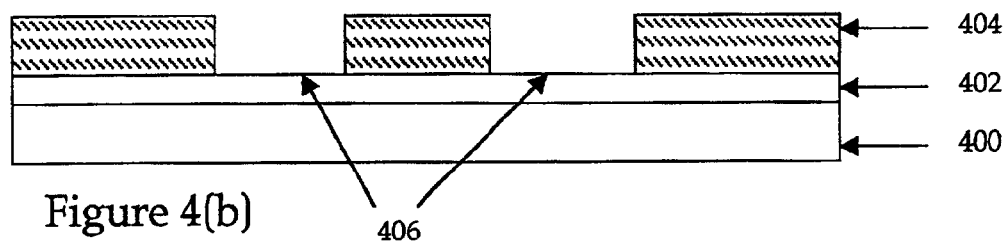
Figure 4C:
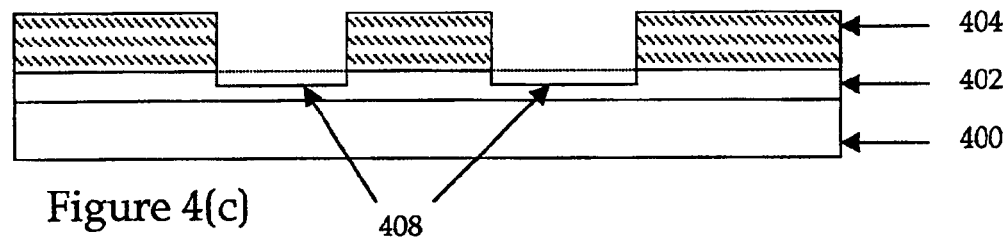

FIG. 4(b) illustrates the mask 404 after the mask has been exposed to a pulsating laser, electron, or ion beam, where the pulsing of the beam is determined by the desired pattern to be created in the recording layer 402. The mask 404 is then developed, such that portions of the mask 404 are removed. With a negative photoresist, for example, those portions exposed to a light source are removed. Alternatively, with other types of resist materials, such as a positive photoresist, the areas not exposed to the light source are removed.

Once portions of the mask 404 are removed, regions of the recording layer 406 corresponding to the removed mask are exposed. In certain embodiments, an etch may then be performed to create grooves 408 in the recording layer 402 (FIG. 4(c)). The etch may be implemented in any desired manner. For example, a reactive ion etch may be performed.

Figure 4D:
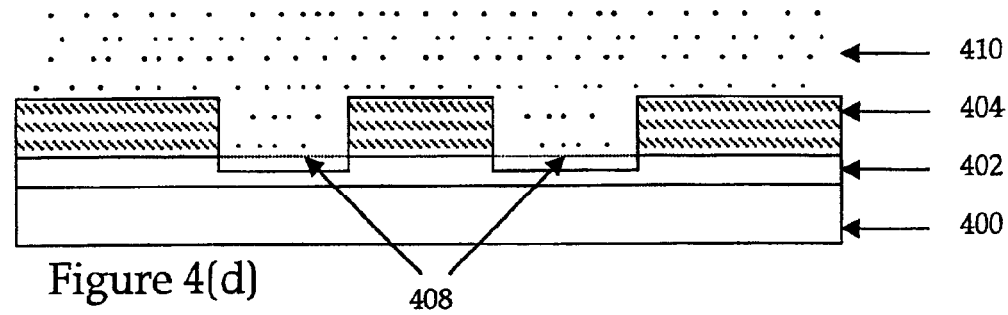

The structure is then exposed to a plasma 410, as shown in FIG. 4(d). The plasma 410 overlies the exposed regions 406 of the recording layer 402 and the remaining mask 404. Ions within the plasma 410 interact with the exposed regions 406 of the recording layer 402 to alter the magnetic properties of the exposed regions 406 of the recording layer 402. The plasma 410 may be implemented and configured in any desired manner. For example, the plasma 410 may include, but is not limited to, a sputtering oxidation, such as an argon, or argon and oxygen, gas. However, other types of plasma 410 may be used with the present invention. The type of plasma used will be determined by how well the plasma changes the magnetic properties in the exposed region of the recording layer. Thus, the selection of the plasma may depend upon the material or materials in the recording layer.

In certain embodiments, the plasma 410 may alter one or more layers within recording layer 402 physically. Thus, the grooves 408 (FIG. 4(c)) may compensate for any expansion in the recording layer caused by the plasma. The depth of the etch may depend on the thickness of the recording layer and the type of plasma used. When completed, the surface of the recording layer 402 should be flat or near flat such that a recording head is not disturbed as it flies over the recording layer.

Figure 4E:
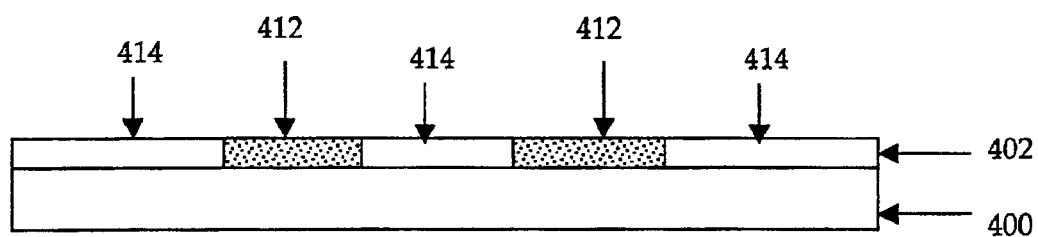

FIG. 4(e) illustrates the structure after the remaining mask 404 is removed. The resulting recording layer 402 comprises areas of differing magnetic properties. The regions 412 of the recording layer 402 that were exposed to the plasma 410 have different magnetic properties than the regions 414 of the recording layer 402 that were covered by the mask 404.

Thus, the present invention can be used to create recordable regions and non-recordable regions in a recording layer. For example, if the recording layer is comprised of a high coercivity media that is non-recordable with conventional recording heads, the present invention can be utilized to create regions 412 having a lower coercivity level. These regions 412 of lower coercivity then become recordable, and can be used to store data, including servo data, on the storage disk. Alternatively, if the recording layer is comprised of a low coercivity media that is recordable, the present invention can be utilized to create regions 412 having a lower coercivity level. These regions 412 of lower coercivity then become non-recordable, and can be used to define the areas on a storage disk that can be used to store data.

Figure 5A:
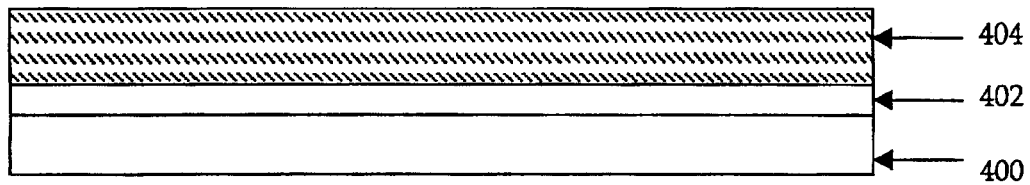
FIGS. 5(a)–5(f) are diagrams depicting an exemplary method for replicating magnetic patterns on a hard disk media according to another embodiment of the present invention.

FIGS. 5(a)–5(f) are diagrams depicting an exemplary method for replicating magnetic patterns on a hard disk media according to another embodiment of the present invention. FIG. 5(a) depicts a substrate 400, which can be comprised of a glass ceramic substrate, an aluminum substrate, or an aluminum substrate with a nickel phosphorus coating. A recording layer 402 lies on the surface of the substrate 400, and is used to write data to, and read data from, the storage disk. A mask 404 overlies the recording layer 402. The discussion regarding the substrate, recording layer, and mask above apply to this embodiment as well and therefore will not be repeated.

Figure 5B:
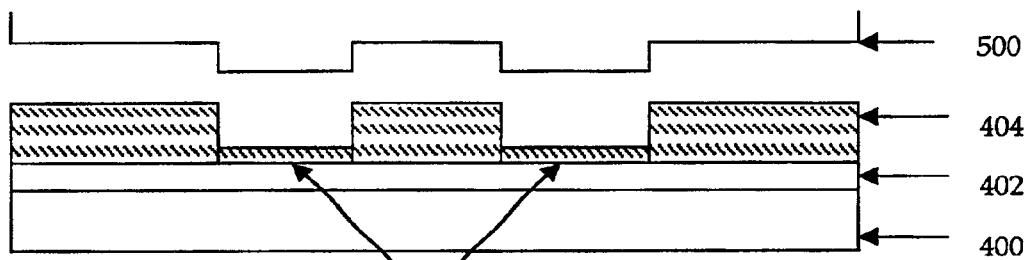
Figure 5C:
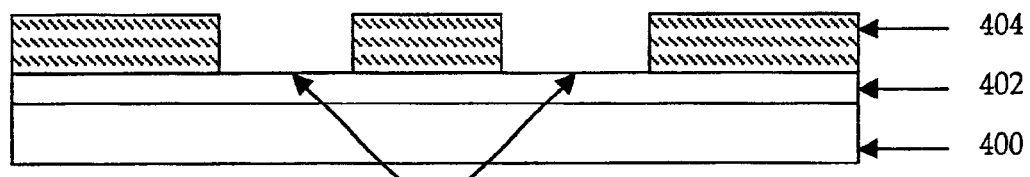
Figure 5D:
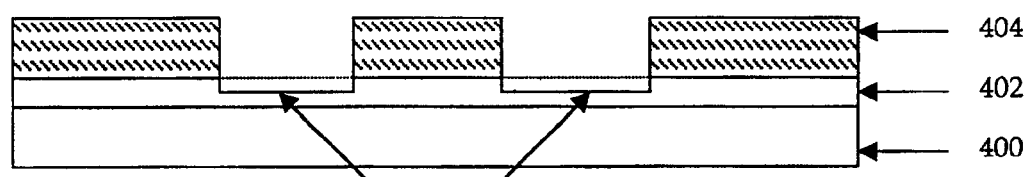

A stamper 500 is then pressed into the mask 404 in order to transfer a pattern from the surface of the stamper 500 into the surface of the mask 404. FIG. 5(b) shows how portions of the mask 404 are compressed 502, while other portions of the mask 404 are at or near their original thickness. The compressed portions 502 of the mask 404 are then removed in order to expose portions 504 of the recording layer 404 (FIG. 5(c)). The removal of the compressed portions 502 of the mask 404 may be implemented in any desired manner. For example, the compressed portions 502 may be removed using a vacuum etch process, such as a sputter etch or a reactive ion etch.

Once portions of the mask 404 are removed, regions of the recording layer 504 corresponding to the removed mask are exposed. In certain embodiments, an etch may then be performed to create grooves 506 in the recording layer 402 (FIG. 5(d)). The etch may be implemented in any desired manner. For example, a reactive ion etch may be performed.

Figure 5E:
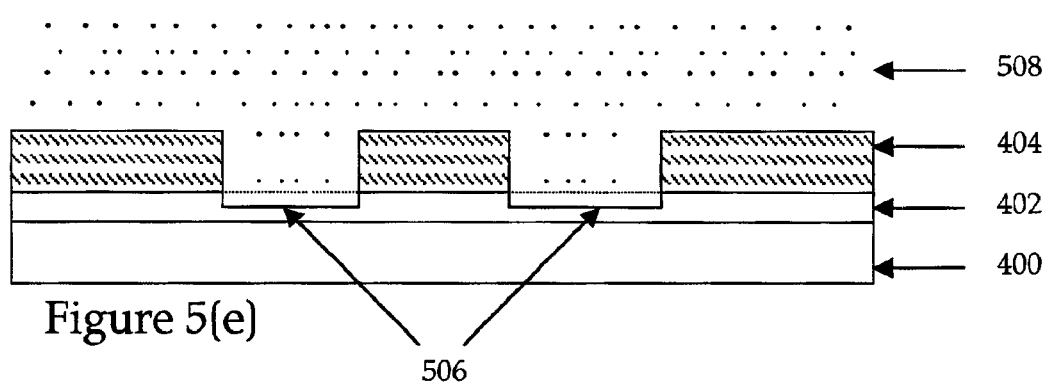

The structure is then exposed to a plasma 508, as shown in FIG. 5(e). Ions within the plasma 508 interact directly with the exposed regions 504 of the recording layer 402. The plasma 508 may then alter the magnetic properties of the exposed regions 504 of the recording layer 402. The plasma 508 may be implemented and configured in any desired manner. For example, the plasma 508 may include, but is not limited to, a sputtering oxidation, such as an argon or argon and oxygen plasma. However, other types of plasma 508 may be used with the present invention. The type of plasma used will be determined by how well the plasma changes the magnetic properties in the exposed regions of the recording layer. Thus, the selection of the plasma may depend upon the material or materials in the recording layer.

Figure 5F:
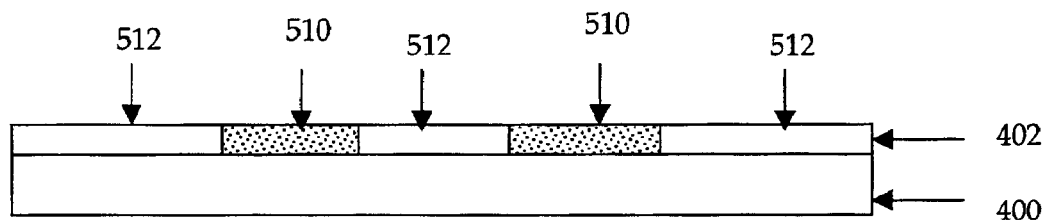

The remaining mask 404 is then removed, as shown in FIG. 5(f). The resulting recording layer 402 comprises areas of differing magnetic properties. The regions 510 of the recording layer 402 that were exposed to the plasma 508 have different magnetic properties than the regions 512 of the recording layer 402 that were covered by the mask 404. As with the earlier embodiments, the present invention can be used to create recordable regions and non-recordable regions in a recording layer.

As discussed above, the embodiment of FIG. 5 utilizes a stamper 500 to imprint a desired pattern in the mask. One method for making a stamper 500 will now be described. The present invention, however, is not limited to this method. Any technique that creates a device for imprinting a pattern into the mask may be used with the present invention.

The stamper 500 may be comprised of a metal layer, such as nickel, and is created from a master disk. A master disk is a recording disk that is manufactured using very specialized machinery in order to obtain precise positional and geometric features. A master is usually made by taking a polished glass disk and spin-coating a thin layer of photoresist material over a surface of the glass disk. The photoresist material typically used is Novolak with DNQ active components.

The photoresist material is then exposed to a pulsating laser, electron, or ion beam, where the pulsing of the beam is determined by the desired format pattern that is to be patterned into a magnetic media. A programmable formatter provides the necessary signal to modulate the recording laser beam with the desired format pattern. In the present invention, the format patterns can vary from one disk drive model to another, so the formatter is programmable in order to output the desired modulated signals for a specific format pattern.

The laser, electron, or ion beam output by the formatter has the ability to define very small features, such as one hundred nanometers in size or smaller. Having the ability to define small or very dense format patterns means these small format patterns will be transferred to the stamper 500, which in turn means the small format pattern will be transferred to the mask 404.

Once the photoresist layer has been selectively exposed, the exposed areas are removed by washing them away with a developing solution. The remaining portions of the photoresist layer define the desired format pattern. A first stamper is then made from the master disk by sputtering or evaporating a metal layer directly onto the photoresist layer. Since the deposition rate is relatively slow, only a thin layer of metal is coated over the photoresist layer in a reasonable time. Therefore, in order to make the first stamper more robust, an electroplating process is used to form a thicker layer of metal on the first stamper. Nickel is typically the metal used in the electroplating process, and the first stamper usually reaches a thickness of 0.3 millimeters.

The first stamper is then peeled away from the photoresist layer and is commonly used to create copies. A copy of the first stamper is created by first passivating the first stamper by providing a monolayer of oxide on the surface of the metal stamper. Passivation can be accomplished chemically by dipping the first stamper into an oxidizing solution, or electrochemically by making the first stamper an anode in an electrical circuit. After a thin layer of oxide forms on the surface of the first stamper, another electroplating process is performed and a layer of metal forms over the oxide layer. The layer of metal is then peeled away from the first stamper, whereby the layer of metal forms a copy of the first stamper. This copy, however, has a reverse image of the format pattern on its surface. So the copy is passivated and an electroplating process is performed in order to fabricate a second copy. Now, the second copy has the same format pattern as the first stamper, and the second copy is then used to form the desired pattern into the mask.

The process described above is known in the art as a "family making process." The first stamper is known as the "father", and the copy of the first stamper is known as the "mother". The mother contains the reverse image of the format pattern. The second copy is known as the "son." The mother can be recycled may times in order to create a plurality of sons. Furthermore, the sons can be used multiple times, making them the perfect tool for a mass manufacturing process.

Figure 6:
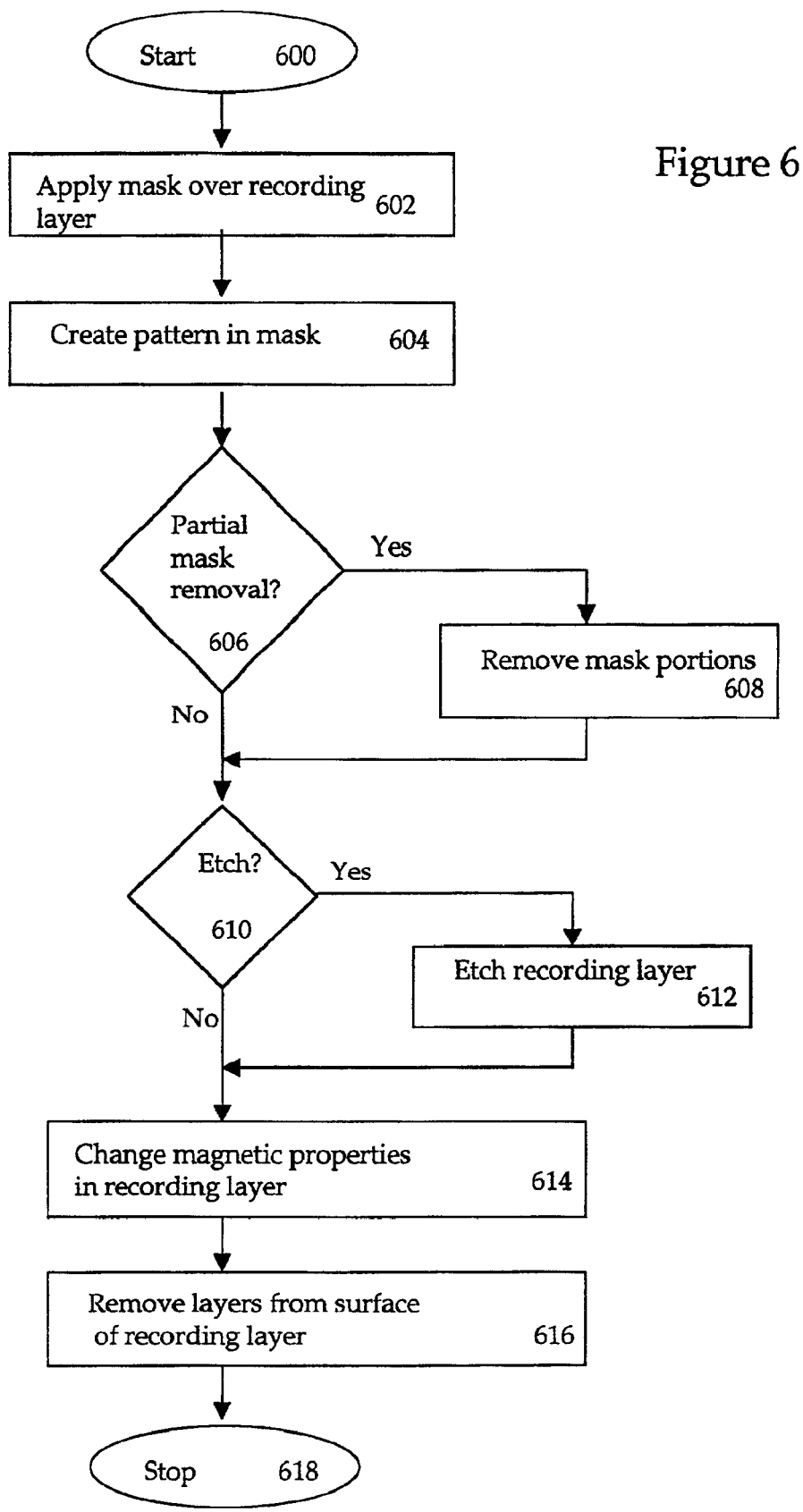
FIG. 6 is a flowchart illustrating an exemplary method for replicating magnetic patterns on a hard disk media according to another embodiment of the present invention.

Referring to FIG. 6, a flowchart illustrating an exemplary method for replicating magnetic patterns on a hard disk media according to another embodiment of the present invention is shown. The method begins at block 600, and thereafter passes to block 602 where a mask is applied on the surface or above the surface of the recording layer. Next, the desired pattern is created in the mask (block 604). The pattern may be created in any desired manner. For example, the pattern may be created using photolithography or imprint lithography.

In certain embodiments, however, the steps depicted in blocks 602 and 604 may be performed in the reverse order. The pattern may be created in the mask and then the mask may be placed on or over the recording layer.

Referring now to block 606, a determination is then made as to whether or not portions of the mask should be removed. For example, if imprint lithography was used to create the pattern, the compressed portions of the mask may need to be removed. If portions of the mask are to be removed, the process continues at block 608 with the removal of the desired portions of the mask.

If, however, portions of the mask do not need to be removed, the process passes to bock 610, where a determination is made as to whether or not an etch should be performed. For example, grooves may need to be created in one or more layers within the recording layer if portions of the recording layer will be changed physically when exposed to the plasma. If an etch is to be performed, the process passes to block 612 where an etch is performed.

If however, an etch does not need to be performed, the process continues at block 614 where the magnetic properties of portions of the recording layer are altered. Changing the magnetic properties of portions of the recording layer may be implemented in any desired manner. For example, exposure to a plasma may be performed.

Once the magnetic properties of portions of the recording layer have been changed, any remaining layers overlying the recording layer are removed. This step is illustrated in block 616. The resulting recording layer now comprises areas of differing magnetic properties, thereby creating recordable regions and non-recordable regions in the recording layer. The method then ends, as shown in block 618.

While the invention has been particularly shown and described with reference to a preferred embodiment, it will be understood by those skilled in the art that various changes in form and detail may be made therein without departing from the spirit and scope of the invention.

What is claimed is:

1. A method for creating recordable regions and non-recordable regions in a recording layer, the method comprising the steps of:
    forming a mask over the recording layer;
    defining a pattern in the mask leaving an exposed portion of the recording layer, wherein the pattern defines the recordable regions and the non-recordable regions to be created in at least one layer in the recording layer;
    changing the magnetic properties of portions of the recording layer by exposing the mask and the exposed portions of the recording layer to a plasma, wherein the magnetic properties of at least one layer in the exposed portions of the recording layer are changed, in order to create recordable regions or non-recordable regions in the recording layer; and
    removing the mask.

2. The method of claim 1, wherein the recording layer is comprised of a single, dual, or multi-layer recording layer.

3. The method of claim 2, wherein the step of defining a pattern in the mask comprises the step of defining a pattern in the mask using photolithography.

4. The method of claim 3, wherein the step of defining a pattern in the mask using photolithography exposes portions of the recording layer.

5. The method of claim 4, wherein the step of changing the magnetic properties of portions of the recording layer comprises the step of exposing the mask and the exposed portions of the recording layer to a plasma, wherein the magnetic properties of at least one layer in the exposed portions of the recording layer are changed.

6. The method of claim 4, further comprising the step of etching away a portion of the recording layer in the exposed portions of the recording layer, wherein grooves are formed in at least one layer within the exposed portions of the recording layer.

7. The method of claim 6, wherein the step of changing the magnetic properties of portions of the recording layer comprises the step of exposing the mask and the exposed portions of the recording layer to a plasma, wherein the magnetic properties of at least one layer in the exposed portions of the recording layer are changed.

8. The method of claim 2, wherein the step of defining a pattern in the mask comprises the step of defining a pattern in the mask using imprint lithography.

9. The method of claim 8, further comprising the step of removing at least a portion of the mask after performing imprint lithography, wherein portions of the recording layer are exposed.

10. The method of claim 9, wherein the step of changing the magnetic properties of portions of the recording layer comprises the step of exposing the mask and the exposed portions of the recording layer to a plasma, wherein the magnetic properties of at least one layer in the exposed portions of the recording layer are changed.

11. The method of claim 9, further comprising the step of etching away a portion of the recording layer in the exposed portions of the recording layer, wherein grooves are formed in at least one layer within the exposed portions of the recording layer.

12. The method of claim 11, wherein the step of changing the magnetic properties of portions of the recording layer comprises the step of exposing the mask and the exposed portions of the recording layer to a plasma, wherein the magnetic properties of at least one layer in the exposed portions of the recording layer are changed.

13. A system for creating recordable regions and non-recordable regions in a recording layer, the system comprising:
   means for placing a mask over the recording layer, wherein the mask includes a pattern that defines the recordable regions and the non-recordable regions to be created in the recording layer,
   means for changing the magnetic properties of portions of the recording layer by exposing the mask and the exposed portions of the recording layer to a plasma, wherein the magnetic properties of at least one layer in the exposed portions of the recording layer are changed, in order to create recordable regions or non-recordable regions in the recording layer; and
   means for removing the mask.

14. The system of claim 13, wherein the recording layer is comprised of a single, dual, or multi-layer recording layer.

15. The system of claim 14, wherein the means for placing a mask over the recording layer comprises:
   means for forming a mask over the recording layer; and
   means for defining a pattern in the mask, wherein the pattern defines the recordable regions and the non-recordable regions to be created in at least one layer in the recording layer.

16. The system of claim 15, wherein the means for defining a pattern in the mask exposes portions of the recording layer.

17. The system of claim 16, wherein the means for changing the magnetic properties of portions of the recording layer comprises means for exposing the mask and the exposed portions of the recording layer to a plasma, wherein the magnetic properties of at least one layer in the exposed portions of the recording layer are changed.

18. The system of claim 16, further comprising means for etching away a portion of the recording layer in the exposed portions of the recording layer to form grooves in at least one layer within the exposed portions of the recording layer.

19. The system of claim 18, wherein the means for changing the magnetic properties of portions of the recording layer comprises means for exposing the mask and the exposed portions of the recording layer to a plasma, wherein the magnetic properties of at least one layer in the exposed portions of the recording layer are changed.

20. The system of claim 15, where in the means for defining a pattern in the mask compresses portions of the mask.

21. The system of claim 20, further comprising means for removing the compressed portions of the mask in order to expose portions of the recording layer.

22. The system of claim 21, wherein the means for changing the magnetic properties of portions of the recording layer comprises means for exposing the mask and the exposed portions of the recording layer to a plasma, wherein the magnetic properties of at least one layer in the exposed portions of the recording layer are changed.

23. The system of claim 21, further comprising means for etching away a portion of the recording layer in the exposed portions of the recording layer to form grooves in at least one layer within the exposed portions of the recording layer.

24. The system of claim 23, wherein the means for changing the magnetic properties of portions of the recording layer comprises means for exposing the mask and the exposed portions of the recording layer to a plasma, wherein the magnetic properties of at least one layer in the exposed portions of the recording layer are changed.

* * * * *